(12) United States Patent
Jain et al.

(10) Patent No.: US 12,732,273 B1
(45) Date of Patent: Sep. 8, 2026

(54) MULTI-APERTURE TELESCOPE SYSTEM AND METHOD FOR GENERATING COMBINED OPTICAL SIGNALS RECEIVED FROM SATELLITES

(71) Applicant: QOSMIC SATELLITE SYSTEMS PVT LTD, Bangalore (IN)

(72) Inventors: Shreyaans Jain, Bangalore (IN); Rohit Kuzhiyodiparambil Ramakrishnan, Bangalore (IN)

(73) Assignee: QOSMIC SATELLITE SYSTEMS PVT LTD, Bangalore (IN)

( * ) Notice: Subject to any disclaimer, the term of this patent is extended or adjusted under 35 U.S.C. 154(b) by 0 days.

(21) Appl. No.: 19/641,644

(22) Filed: Apr. 8, 2026

(51) Int. Cl.
*H04B 10/118* (2013.01)

(52) U.S. Cl.
CPC .................................. *H04B 10/118* (2013.01)

(58) Field of Classification Search
CPC .................................................... H04B 10/118
USPC ........................... 398/125, 121, 118, 96, 130
See application file for complete search history.

(56) References Cited

U.S. PATENT DOCUMENTS 5,108,168 A * 4/1992 Norbert. Massie A ..................... G02B 23/00 359/429
5,159,489 A * 10/1992 Massie .................. G02B 7/183 359/429
5,208,654 A * 5/1993 Shao ....................... G01S 17/87 356/498
7,405,834 B1 * 7/2008 Marron ................. G01S 7/4812 356/450
7,631,839 B1 * 12/2009 Duncan .................. G02B 27/58 359/399
2017/0366264 A1 * 12/2017 Riesing ................ H04B 10/615
2021/0263299 A1 * 8/2021 Ducellier ........... G02B 17/0808
2022/0026700 A1 * 1/2022 Dantowitz ............. G02B 23/00
2022/0077929 A1 * 3/2022 Finch ................... H04B 10/118
2022/0158728 A1 * 5/2022 Steinlechner ........ H04B 10/112

* cited by examiner

*Primary Examiner* — Juan A Torres
(74) *Attorney, Agent, or Firm* — Jason C. Cameron

(57) ABSTRACT

Presented is a multi-aperture telescope system and method for generating combined optical signals received from satellites. The multi-aperture telescope system comprises plurality of telescope units comprises: primary optical telescope assembly capturing optical signals from satellites, and precision optics collecting optical signals from primary optical telescope assembly. The multi-aperture telescope system includes mounting pedestals supporting corresponding telescope unit for providing stability to telescope units, and providing height adjustment capability, angular positioning, rotational mounting for tracking movement of satellites, and vibration isolation for telescope units. The optical path system comprising mirror assemblies redirecting collected optical signals toward central processing unit. Optical detectors configured to generate combined optical signals possessing an equivalent signal strength to single telescope unit with collecting area equal to sum of collecting areas of telescope units.

20 Claims, 10 Drawing Sheets

CAPTURE, BY A PRIMARY OPTICAL TELESCOPE ASSEMBLY OF EACH OF A PLURALITY OF TELESCOPE UNITS, A PORTION OF ONE OR MORE OPTICAL SIGNALS FROM THE ONE OR MORE SATELLITES, WHEREIN THE PLURALITY OF TELESCOPE UNITS ARE ARRANGED ON A PLATFORM BASE, AND WHEREIN THE PLATFORM BASE POSSESSES A GEOMETRY DEFINING ONE OR MORE MOUNTING POINTS

902

COLLECT, BY A PRECISION OPTICS OF EACH OF THE PLURALITY OF TELESCOPE UNITS THE CAPTURED ONE OR MORE OPTICAL SIGNALS FROM THE PRIMARY OPTICAL TELESCOPE ASSEMBLY

904

SUPPORT, BY EACH MOUNTING PEDESTAL OF THE ONE OR MORE MOUNTING PEDESTALS, CORRESPONDING TELESCOPE UNIT OF THE PLURALITY OF TELESCOPE UNITS FOR PROVIDING STABILITY TO THE PLURALITY OF TELESCOPE UNITS, WHEREIN THE ONE OR MORE MOUNTING PEDESTALS ARRANGED ON THE PLATFORM BASE

906

PROVIDE, BY EACH MOUNTING PEDESTAL OF THE ONE OR MORE MOUNTING PEDESTALS, HEIGHT ADJUSTMENT CAPABILITY, ANGULAR POSITIONING, ROTATIONAL MOUNTING FOR TRACKING MOVEMENT OF THE ONE OR MORE SATELLITES, AND VIBRATION ISOLATION FOR THE PLURALITY OF TELESCOPE UNITS

908

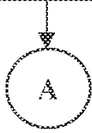

FIG. 9A

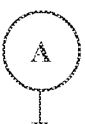

REDIRECT, BY AT LEAST ONE OF: A PLURALITY OF MIRROR ASSEMBLIES AND OPTICAL FIBERS, OF AN OPTICAL PATH SYSTEM, THE COLLECTED ONE OR MORE OPTICAL SIGNALS FROM THE PRECISION OPTICS OF EACH OF THE PLURALITY OF TELESCOPE UNITS TOWARD A CENTRAL PROCESSING UNIT, WHEREIN THE OPTICAL PATH SYSTEM IS CONFIGURED TO MAINTAIN OPTICAL PATH LENGTH CONSISTENCY AMONG THE PLURALITY OF TELESCOPE UNITS FOR COHERENT DETECTION

910

UPON RECEIVING THE REDIRECTED ONE OR MORE OPTICAL SIGNALS FROM THE PRECISION OPTICS OF EACH OF THE PLURALITY OF TELESCOPE UNITS, COMBIN, BY ONE OR MORE OPTICAL DETECTORS, THE REDIRECTED ONE OR MORE OPTICAL SIGNALS

912

GENERATE, BY THE ONE OR MORE OPTICAL DETECTORS, THE COMBINED ONE OR MORE OPTICAL SIGNALS POSSESSING AN EQUIVALENT SIGNAL STRENGTH TO A SINGLE TELESCOPE UNIT WITH A COLLECTING AREA EQUAL TO A SUM OF COLLECTING AREAS OF THE PLURALITY OF TELESCOPE UNITS, WHEREIN THE ONE OR MORE OPTICAL DETECTORS ARE POSITIONED AT THE CENTRAL PROCESSING UNIT

MULTI-APERTURE TELESCOPE SYSTEM AND METHOD FOR GENERATING COMBINED OPTICAL SIGNALS RECEIVED FROM SATELLITES

EARLIEST PRIORITY DATE

This application claims priority from a Provisional patent application filed in India having patent application No. 202641024534, filed on 2 Mar. 2026 and titled "MULTI-APERTURE TELESCOPE SYSTEM AND METHOD FOR GENERATING COMBINED OPTICAL SIGNALS RECEIVED FROM SATELLITES".

FIELD OF INVENTION

Embodiments of the present invention relate to optical communication systems, and more particularly to a multi-aperture telescope system and method for generating combined one or more optical signals received from one or more satellites.

BACKGROUND

Optical ground stations are critical components of satellite communication systems, enabling high-data-rate links between spaceborne platforms and terrestrial networks. Conventional optical ground stations typically rely on single, large-aperture telescopes to receive weak optical signals transmitted from satellites. While the below existing systems are capable of achieving the required optical gain, they introduce substantial technical, economic, and operational limitations that restrict widespread deployment and scalability.

Existing optical ground station systems depend on large-diameter telescopes, often exceeding one meter in aperture, to achieve sufficient signal collection efficiency. The cost of manufacturing precision optical components increases rapidly with aperture size, resulting in extremely high capital expenditures. These systems frequently require custom fabrication, driving total system costs into the range of hundreds of thousands to millions of dollars per installation.

Large-aperture optical telescopes require specialized manufacturing processes, precision polishing, and alignment procedures that can only be performed by a limited number of suppliers. Procurement is characterized by long lead times, limited availability of off-the-shelf components, and complex quality assurance and optical testing requirements. These factors significantly delay deployment timelines and increase system risk.

Due to their size and weight, conventional telescope systems present significant logistical difficulties. Transportation often requires specialized handling and protective packaging, increasing shipping costs and the likelihood of damage. Installation at ground station sites, particularly remote or geographically constrained locations, requires heavy-lifting equipment and complex on-site assembly procedures, further increasing deployment complexity.

Conventional optical ground stations are typically implemented as single, monolithic telescope systems. Such architectures do not support incremental capacity expansion and require full system replacement to increase performance. Additionally, these systems lack inherent redundancy, resulting in single points of failure that can disrupt ground station operations.

Existing ground station designs lack modularity and are not easily reconfigurable. They cannot dynamically adapt to changing mission requirements, varying traffic demands, or different satellite constellations. Capacity cannot be added or removed without substantial system redesign, limiting the ability to efficiently scale or customize deployments.

Therefore, there is a need for an improved multi-aperture telescope system and method for generating combined one or more optical signals received from one or more satellites, in order to address the above-mentioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In order to overcome the above deficiencies of the prior art, the present disclosure solves the technical problem by providing a multi-aperture telescope system for generating combined one or more optical signals received from one or more satellites.

In accordance with an embodiment of the present invention, a multi-aperture telescope system for generating combined one or more optical signals received from one or more satellites, is disclosed. The multi-aperture telescope system comprises a platform base possessing a geometry defining one or more mounting points. The multi-aperture telescope system further comprises a plurality of telescope units arranged on the platform base. Each telescope unit comprises a primary optical telescope assembly configured to capture a portion of one or more optical signals from the one or more satellites. Each telescope unit further comprises a precision optics configured to collect the captured one or more optical signals from the primary optical telescope assembly.

The multi-aperture telescope system further comprises one or more mounting pedestals arranged on the platform base. Each mounting pedestal of the one or more mounting pedestals is configured to: (a) support corresponding telescope unit of the plurality of telescope units for providing stability to the plurality of telescope units; and (b) provide height adjustment capability, angular positioning, rotational mounting for tracking movement of the one or more satellites, and vibration isolation for the plurality of telescope units.

The multi-aperture telescope system further comprises an optical path system comprising at least one of: a plurality of mirror assemblies and optical fibers, configured to redirect the collected one or more optical signals from the precision optics of each of the plurality of telescope units toward a central processing unit. The optical path system is configured to maintain optical path length consistency among the plurality of telescope units. The multi-aperture telescope system further comprises one or more optical detectors positioned at the central processing unit and configured to: (a) upon receiving the redirected one or more optical signals from the precision optics of each of the plurality of telescope units, combine the redirected one or more optical signals; and (b) generate the combined one or more optical signals possessing an equivalent signal strength to a single telescope unit with a collecting area equal to a sum of collecting areas of the plurality of telescope units.

In an embodiment, the plurality of telescope units collectively define a combined collecting area at least one of: equal to and greater than a collecting area associated with a single telescope unit of equivalent diameter D, wherein individual telescope units possess at least one of: equal and unequal aperture diameters, which are dependent of fried parameter $r_0$, selected according to at least one of: atmospheric conditions, the geometry of the platform base, and number of the plurality of telescope units.

In another embodiment, each telescope unit of the plurality of telescope units is selectively configurable to operate as a transmit telescope for transmitting the one or more optical signals toward a remote terminal, and to dynamically switch between transmit and receive operation.

In another embodiment, the optical path system is configured to combine the redirected one or more optical signals coherently at the one or more optical detectors by controlling optical path lengths to maintain phase relationships among the redirected one or more optical signals from the precision optics of each of the plurality of telescope units.

In yet another embodiment, the optical path system is configured to combine the redirected one or more optical signals incoherently at the one or more optical detectors by combining intensities of the redirected one or more optical signals from the precision optics of each of the plurality of telescope units.

In yet another embodiment, each of the plurality of telescope units is configured to be operated independently, adapting the multi-aperture telescope system in a multi-aperture optical ground station to continue functioning when at least one of the plurality of telescope units is non-operational.

In yet another embodiment, the platform base possesses at least one of: a hexagonal geometry, a linear geometry, a circular geometry, and a random geometry. The platform base comprises pre-determined number of telescope units positioned at vertices of the corresponding geometry.

In yet another embodiment, each of the plurality of telescope units is a hot-swappable module configured to be removed and replaced without shutting down the multi-aperture telescope system in the multi-aperture optical ground station.

In yet another embodiment, the central processing unit comprises at least one of: a signal combining optics and detection and data processing electronics, configured to process the combined one or more optical signals for downstream and upstream communication.

In an aspect, a multi-aperture telescope method for generating combined one or more optical signals received from one or more satellites based on a multi-aperture telescope system, is disclosed. The multi-aperture telescope method comprises capturing, by a primary optical telescope assembly of each of a plurality of telescope units, a portion of one or more optical signals from the one or more satellites. The plurality of telescope units are arranged on a platform base. The platform base possesses a geometry defining one or more mounting points.

The multi-aperture telescope method further comprises collecting, by a precision optics of each of the plurality of telescope units the captured one or more optical signals from the primary optical telescope assembly. The multi-aperture telescope method further comprises supporting, by each mounting pedestal of one or more mounting pedestals, corresponding telescope unit of the plurality of telescope units for providing stability to the plurality of telescope units. The one or more mounting pedestals arranged on the platform base.

The multi-aperture telescope method further comprises providing, by each mounting pedestal of the one or more mounting pedestals, height adjustment capability, angular positioning, rotational mounting for tracking movement of the one or more satellites, and vibration isolation for the plurality of telescope units. The multi-aperture telescope method further comprises redirecting, by at least one of: a plurality of mirror assemblies and optical fibers, the collected one or more optical signals from the precision optics of each of the plurality of telescope units toward a central processing unit. The optical path system is configured to maintain optical path length consistency among the plurality of telescope units for coherent detection, but not mandatory for incoherent detection.

The multi-aperture telescope method further comprises upon receiving the redirected one or more optical signals from the precision optics of each of the plurality of telescope units, combining, by the one or more optical detectors, the redirected one or more optical signals. The multi-aperture telescope method further comprises generating, by the one or more optical detectors, the combined one or more optical signals possessing an equivalent signal strength to a single telescope unit with a collecting area equal to a sum of collecting areas of the plurality of telescope units.

In another aspect, a non-transitory computer-readable storage medium having instructions stored therein that, when executed by a hardware processor, causes the processor to perform method steps as described above.

To further clarify the advantages and features of the present invention, a more particular description of the invention will follow by reference to specific embodiments thereof, which are illustrated in the appended figures. It is to be appreciated that these figures depict only typical embodiments of the invention and are therefore not to be considered limiting in scope. The invention will be described and explained with additional specificity and detail with the appended figures.

BRIEF DESCRIPTION OF THE DRAWINGS

The disclosure will be described and explained with additional specificity and detail with the accompanying figures in which:

FIG. 9A-9B is a flow chart illustrating a multi-aperture telescope method for generating the combined optical signals received from the one or more satellites, in accordance with an embodiment of the present disclosure.

Figure 1:
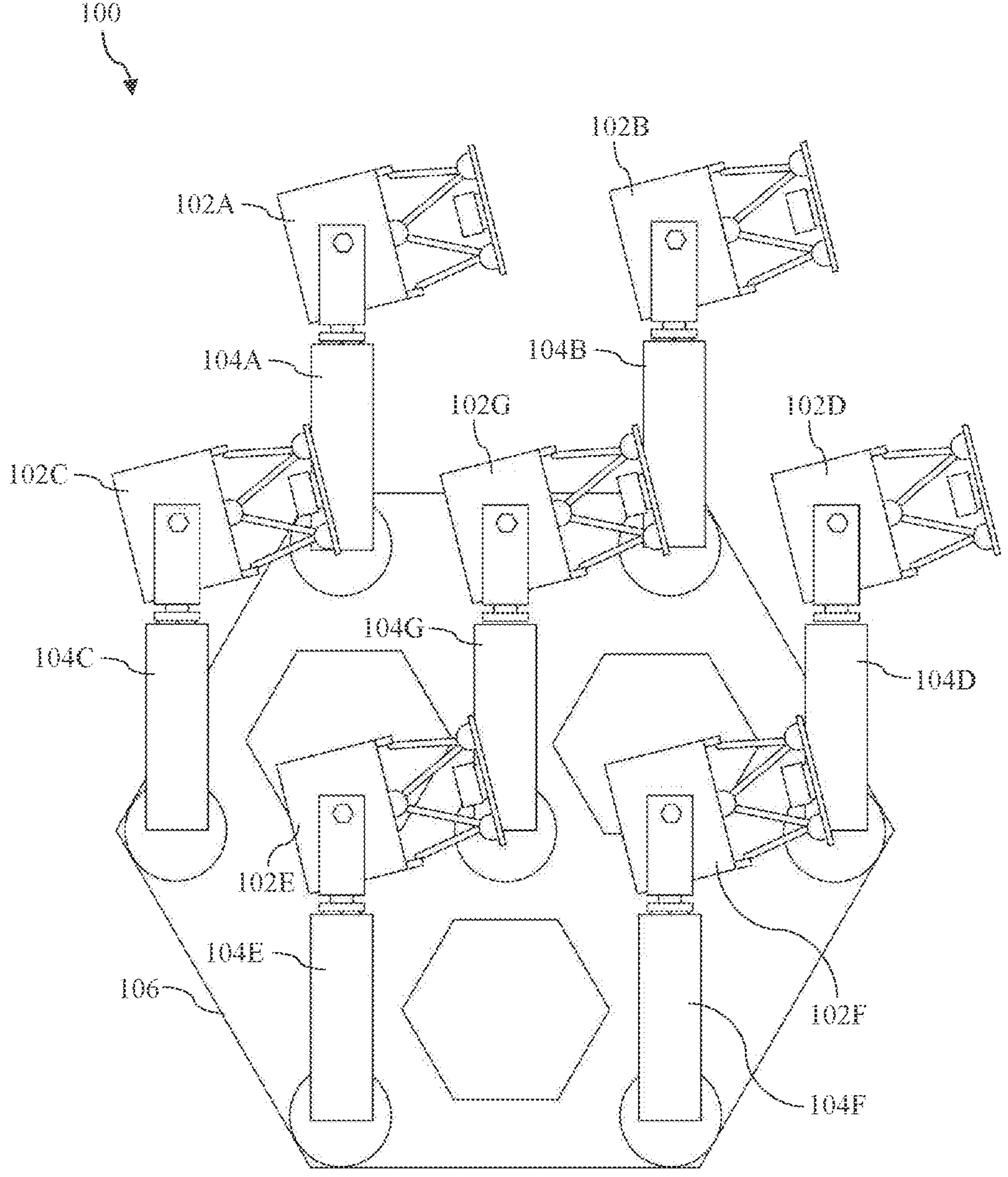
FIG. 1 illustrates a schematic representation of a multi-aperture telescope system for optical ground stations configured to generate combined optical signals (e.g., primarily infrared laser beams) received from one or more satellites, in accordance with an embodiment of the present disclosure.

Further, those skilled in the art will appreciate that elements in the figures are illustrated for simplicity and may not have necessarily been drawn to scale. Furthermore, in terms of the method steps, equipment and parameters used herein may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE PRESENT INVENTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more components preceded by "comprises . . . a" does not, without more constraints, preclude the existence of other components or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client, or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired), or temporarily configured (programmed) to operate in a certain manner and/or to perform certain operations described herein.

Referring now to the drawings, and more particularly to FIG. 1 through FIG. 9B where similar reference characters denote corresponding features consistently throughout the figures, there are shown preferred embodiments, and these embodiments are described in the context of the following exemplary system and/or method.

FIG. 1 illustrates a schematic representation of a multi-aperture telescope system 100 for optical ground stations configured to generate combined optical signals (primarily infrared laser beams) received from one or more satellites, in accordance with an embodiment of the present disclosure. The multi-aperture telescope system 100 includes a platform base 106 possessing a geometry defining one or more mounting points. The platform base 106 is a structural platform that serves as a foundation for the entire multi-aperture telescope system 100, providing stable mounting points for a plurality of telescope units 102A-G.

The geometry means that the platform base 106 has a specific shape or configuration, such as hexagonal, linear, circular, or random. In an embodiment, the platform base 106 comprises pre-determined number of the plurality of telescope units 102A-G positioned at vertices of the corresponding geometry and at least one telescope unit positioned at a center of the corresponding geometry. In an embodiment, the number of the plurality of telescope units 102A-G is dependent on the specific shape or configuration of the platform base 106. The platform base 106 can possess at least one of four different geometric configurations: hexagonal geometry where the platform base 106 has a six-sided shape, linear geometry where the plurality of telescope units 102A-G are arranged in a straight line, circular geometry where the plurality of telescope units 102A-G are positioned along a circular pattern, or random geometry where the plurality of telescope units 102A-G are placed in a non-uniform arrangement based on specific site or operational requirements.

Regardless of which geometry is selected, the platform base 106 includes a number of the plurality of telescope units 102A-G positioned at the vertices or key points of that geometry, plus at least one telescope unit positioned at the center of the configuration. For example, in a hexagonal geometry, six telescope units 102A-F are positioned at the six vertices of the hexagon and one telescope unit 102G is positioned at the center, resulting in a seven-telescope array. This flexible geometric approach allows the multi-aperture telescope system 100 to be configured for different deployment scenarios, site constraints, and performance requirements while optimizing the packing arrangement of the plurality of telescope units 102A-G to maximize the total light-collecting area and maintain precise alignment between the plurality of telescope units 102A-G in the array.

The one or more mounting points means the shape of the platform determines where multiple telescope units 102A-G can be positioned and secured. For example, a hexagonal platform base 106 defines seven mounting points i.e., six mounting points at the vertices and one mounting point at the center. The geometry (i.e., hexagonal platform base 106) optimizes the packing arrangement of the plurality of telescope units 102A-G to maximize light collection. This hexagonal platform base 106 maintains precise alignment between the plurality of telescope units 102A-G. In an embodiment, different geometries allow flexibility in configuring the number and arrangement of the plurality of telescope units 102A-G. This design enables the combined collecting area of multiple smaller telescopes to equal that of a single large telescope.

The multi-aperture telescope system 100 further includes the plurality of telescope units 102A-G arranged on the platform base 106 through one or more mounting pedestals 104A-G. In the illustrated FIG. 1, seven telescope units (102A-102G) are arranged in a hexagonal pattern on the platform base 106 through the one or more mounting pedestals 104A-G. Each telescope unit is an independent optical module capable of capturing incoming one or more optical signals from the one or more satellites.

Each telescope unit comprises a primary optical telescope assembly configured to capture a portion of the one or more optical signals from the one or more satellites. The primary optical telescope assembly is a main light-gathering component of each telescope unit. The primary optical telescope assembly includes a primary mirror (shown in FIG. 3) that captures the one or more optical signals, primarily infrared laser beams from the one or more satellites. The primary mirror collects a portion of the incoming wavefront from the satellite signal.

Each telescope unit further comprises a precision optics configured to collect the captured one or more optical signals from the primary optical telescope assembly based on an optical path system. The precision optics is an additional optical component that processes and directs the collected one or more optical signals. The precision optics include a secondary optics (shown in FIG. 3) that further refine and focus the captured one or more optical signals. The precision optics further includes fiber coupling mechanisms (shown in FIG. 3) to couple the one or more optical signals into fibers for transmission to a central processing location (i.e., a central processing unit). The precision optics ensure accurate signal collection from the primary optical telescope assembly.

Each telescope unit further comprises a mechanical housing that is mechanically arranged to protect the primary optical telescope assembly and the precision optics. The mechanical housing protects the primary optical telescope assembly and precision optics from environmental factors. The mechanical housing shields sensitive optical elements from dust, moisture, temperature variations, and physical damage.

In an embodiment, each telescope unit of the plurality of telescope units 102A-G comprises a diameter of D/x, where D is an equivalent diameter of a single large telescope unit possessing a collecting area equal to the sum of collecting areas of the plurality of telescope units 102A-G, and x is dependent on the geometry of the platform base 106 and a number of the plurality of telescope units 102A-G. Each telescope unit in the plurality of telescope units 102A-G has a diameter of D/x, where D represents the diameter of a hypothetical single large telescope that would have the same total light-collecting area as all the smaller telescopes combined. The variable x depends on three factors: fried parameter which depends on atmospheric conditions, the geometry of the platform base 106 (hexagonal, linear, circular, or random) and the total number of telescope units in the array. This relationship is based on the fundamental optical principle that collecting area scales with the square of the diameter (Area=$\pi r^2$). For example, if x equals 2, each small telescope has diameter D/2, and four such telescopes would be needed to match the collecting area of one telescope with diameter D, since each D/2 telescope has one-quarter the area of the large telescope. Similarly, if x equals 4, each telescope has diameter D/4, and sixteen such telescopes would provide equivalent collecting area. This formula allows flexible system design where different combinations of telescope size and quantity can achieve the same total light-gathering capability as a single large telescope.

In another embodiment, the plurality of telescope units 102A-G is configured to collectively define a combined collecting area at least one of: equal to and greater than a collecting area associated with a single telescope unit of equivalent diameter D. The individual telescope units possess at least one of: equal and unequal aperture diameters, which are dependent of fried parameter $r_0$, selected according to at least one of: atmospheric conditions, the geometry of the platform base 106, and number of the plurality of telescope units 102A-G. In an embodiment, each telescope unit of the plurality of telescope units 102A-G is selectively configurable to operate as a transmit telescope for transmitting the one or more optical signals toward a remote terminal, and to dynamically switch between transmit and receive operation.

In an embodiment, each of the plurality of telescope units 102A-G is configured to operate independently, adapting the multi-aperture telescope system 100 in a multi-aperture optical ground station to continue functioning when at least one of the plurality of telescope units 102A-G is non-operational. Each telescope unit in the multi-aperture telescope system 100 is designed to function as a self-contained, autonomous module that captures and processes the one or more optical signals without depending on the other telescope units. This independent operation means that if one or more telescope units fail, become damaged, or require maintenance, the remaining operational telescope units continue capturing the one or more optical signals and the overall system keeps functioning. This provides graceful degradation rather than catastrophic failure i.e., the system performance reduces proportionally with the number of non-operational units rather than shutting down completely.

For example, in a seven-telescope configuration, if one telescope fails, the multi-aperture telescope system 100 still operates at approximately 86% capacity using the remaining six telescopes. This redundancy architecture eliminates single points of failure that exist in traditional single large telescope systems, significantly improving system reliability, availability, and uptime for critical satellite communication links.

In another embodiment, each of the plurality of telescope units 102A-G is a hot-swappable module configured to be removed and replaced without shutting down the multi-aperture telescope system 100 in the multi-aperture optical ground station. Hot-swappable means that any individual telescope unit can be physically removed from the multi-aperture telescope system 100 and replaced with a new or repaired telescope unit while the entire multi-aperture optical ground station continues operating without interruption or shutdown. This is possible because each telescope unit operates independently and the multi-aperture telescope system 100 is designed for graceful degradation, allowing the remaining telescope units to continue capturing and processing optical signals even when one unit is disconnected.

This capability provides significant operational advantages: maintenance and repairs can be performed without disrupting critical satellite communication links, spare telescope modules can be kept on-site for rapid replacement, and failed units can be swapped out immediately rather than waiting for a scheduled maintenance window. The hot-swappable design also simplifies repair procedures since technicians can replace an entire module rather than attempting complex repairs in place, reducing mean time to repair and maximizing system availability and uptime.

The multi-aperture telescope system 100 further includes the one or more mounting pedestals 104A-G arranged on the platform base 106. Each mounting pedestal of the one or more mounting pedestals 104A-G is configured to support corresponding telescope unit of the plurality of telescope units 102A-G for providing stability to the plurality of telescope units 102A-G. Support corresponding telescope unit means each pedestal of the one or more mounting pedestals 104A-G holds and secures its respective telescope unit in place. Providing stability ensures the plurality of telescope units 102A-G remain steady and properly positioned during operation.

Each mounting pedestal of the one or more mounting pedestals 104A-G is further configured to provide height adjustment capability, angular positioning, rotational mounting for tracking movement of the one or more satellites, and vibration isolation for the plurality of telescope units 102A-G. Height adjustment capability allows each pedestal to raise or lower its telescope unit to achieve optimal positioning. The angular positioning enables precise tilting and alignment of each telescope unit with the incoming satellite signal. The rotational mounting for tracking movement allows the plurality of telescope units 102A-G to rotate and follow the one or more satellites as it moves across the sky. The vibration isolation protects the plurality of telescope units 102A-G from environmental vibrations that could disrupt signal capture.

These features enable coordinated tracking where the plurality of telescope units 102A-G maintain alignment with the incoming optical signal simultaneously. The one or more mounting pedestals 104A-G ensure each telescope unit can be independently adjusted while maintaining overall system alignment.

The optical path system comprises at least one of: the plurality of mirror assemblies and optical fibers, configured to redirect the collected one or more optical signals toward the central processing unit. The optical path system is the network of optical components that guides the collected one or more optical signals from each telescope to a common processing point. The plurality of mirror assemblies are multiple sets of mirrors positioned within or between the plurality of telescope units 102A-G. The beam steering optics refers to specialized optical components that precisely aim and align the light beams.

The optical path system is configured to maintain optical path length consistency among the plurality of telescope units 102A-G for coherent detection, but not mandatory for incoherent detection. Maintain the optical path length consistency ensures the distance traveled by light signal from each telescope to the central point is carefully controlled. This consistency is critical for coherent combining where phase relationships between signals must be preserved. The optical path system enables the plurality of telescope units 102A-G to work together as a unified light-collecting array.

The multi-aperture telescope system 100 further includes one or more optical detectors that are positioned at the central processing unit. The one or more optical detectors are configured to combine the redirected one or more optical signals upon receiving the redirected one or more optical signals from the precision optics (i.e., the optical path system) of each of the plurality of telescope units 102A-G. The one or more optical detectors are further configured to generate the combined one or more optical signals possessing an equivalent signal strength to a single telescope unit with a collecting area equal to a sum of collecting areas of the plurality of telescope units 102A-G.

The one or more optical detectors are the light-sensing devices that are located at the central location where all optical paths converge. Combine the redirected optical signals means the optical detectors merges all the incoming light beams/signals into a single unified signal. The one or more optical detectors integrate the combined optical power from all telescope units at its surface. Generate the combined optical signals means the optical detectors produces an output signal from the merged light signal. Possessing the equivalent signal strength to a single telescope unit means the combined optical signal is as strong as if captured by one large telescope unit. The collecting area equal to the sum of collecting areas means the effective light-gathering capability equals all the smaller telescopes added together. For example, four telescopes of diameter D/2 combined produce a signal equivalent to one telescope of diameter D.

In an embodiment, the central processing unit comprises at least one of: a signal combining optics and detection and data processing electronics, configured to process the combined one or more optical signals for downstream and upstream communication. The central processing unit is the core location where the one or more optical signals from the plurality of telescope units 102A-G converge and are processed. The signal combining optics are optical components that merge the incoming light beams/signals from the plurality of telescope units 102A-G into a unified signal at the optical detectors surface. The detection and data processing electronics are electronic systems that convert the combined optical signal into electrical signals and perform functions such as signal amplification, noise filtering, data demodulation, error correction, and protocol conversion.

The phrase "configured to process the combined optical signals for downstream and upstream communication" means these components prepare the received and transmitted satellite data for subsequent transmission to external systems, such as terrestrial communication networks, data centers, internet backbones, or end-user applications. The central processing unit thus serves as the bridge between the optical signal reception performed by the telescope array/the plurality of telescope units 102A-G and the delivery of usable data to external communication infrastructure.

In an embodiment, the optical path system is configured to combine the redirected one or more optical signals coherently at the one or more optical detectors by controlling optical path lengths to maintain phase relationships among the redirected one or more optical signals from the precision optics of each of the plurality of telescope units 102A-G. In coherent combining, the optical path system carefully controls the distance travelled by light signal from each telescope unit so that all the light waves arrive at the one or more optical detectors with their phase relationships preserved and synchronized. The phase refers to the position of a light wave in its cycle at any given moment, and when multiple light waves arrive "in phase," their peaks and troughs align, allowing them to constructively add together for maximum signal strength. This requires precise control of optical path lengths to within a fraction of the wavelength of light, ensuring that signals from all telescope units combine constructively rather than cancelling each other out. The coherent combining is more complex to implement but can achieve higher signal quality compared to incoherent combining.

In another embodiment, the optical path system is configured to combine the redirected one or more optical signals incoherently at the one or more optical detectors by combining intensities of the redirected one or more optical signals from the precision optics of each of the plurality of telescope units 102A-G. The highlighted text defines incoherent combining of optical signals at the one or more optical detectors. In incoherent combining, the optical path system simply adds together the light intensities from each telescope unit without regard to the phase relationships of the light waves. Unlike coherent combining where precise optical path length control is required to synchronize wave phases, incoherent combining focuses only on collecting and summing the total optical power from the plurality of telescope units 102A-G. This approach is simpler to implement because it does not require the complex phase control mechanisms needed for coherent combining. The one or more optical detectors receive the light from all telescopes and integrates the combined optical power, producing a total signal strength proportional to the sum of the individual intensities. While incoherent combining may not achieve the maximum theoretical signal enhancement possible with coherent combining, it provides a practical and effective method for increasing overall signal strength using multiple smaller telescope units.

In an embodiment, the process of generating the combined one or more optical signals from the one or more satellites, is disclosed. The one or more optical signals (e.g., an infrared laser signal) is received at the ground station from the one or more satellites, illuminating the telescope array aperture area. Each of the plurality of telescope units 102A-G captures the portion of the one or more optical signals. For example, six peripheral telescope units 102A-F collect light from their respective aperture areas. The central telescope unit 102G collects the light from the central region. The combined aperture area equals that of a single large telescope.

The collected light (i.e., optical signal) from each of the plurality of telescope units 102A-G is redirected using the plurality of mirror assemblies (i.e., precision mirrors). The plurality of mirror assemblies steer/control the beams toward the central processing unit. The optical path lengths are carefully controlled to maintained phase relationships (for coherent combining) or simply to combine intensities (for incoherent combining). In an embodiment, the beam alignment ensures that all collected optical signals reach the optical detectors.

The one or more optical detectors combine all optical signals at a common optical detectors surface. The one or more optical detectors integrate the combined optical signal/power. In an embodiment, the total optical signal equals the sum of individual telescope contributions. The total optical signal has signal strength equivalent to a single large telescope of diameter D.

The one or more mounting pedestals 104A-G enable coordinated tracking of satellite movement. The plurality of telescope units 102A-G maintain alignment with the incoming optical signal. The synchronized satellite movement maintains the collection of the one or more optical signals.

In an embodiment, the fundamental mathematical relationship governing the multi-aperture telescope system 100, is as follows.

$$\text{Single large telescope: Diameter} = D,$$

$$\text{Collecting Area} = \pi(D/2)^2 = \pi D^2/4$$

$$\text{Array of smaller telescopes: Each diameter} = D/2,$$

$$\text{Individual Area} = \pi(D/4)^2 = \pi D^2/16$$

$$\text{Number of telescopes needed: } N = (\pi D^2/4)/(\pi D^2/16) = 4 \text{ telescopes}$$

Therefore, four telescopes of diameter D/2 provide equivalent collecting area to one telescope of diameter D.

In an embodiment, the scaling principle may be applied to any scaling ratio (i.e., 1 telescope of diameter D=4 telescopes of diameter D/2=16 telescopes of diameter D/4 and the seven-telescope configuration shown exceeds the four-telescope minimum, providing additional margin).

In an aspect, a single-aperture telescope system further includes a mounting pedestal arranged on the platform base. The mounting pedestal is configured to support a telescope unit for providing stability to the telescope unit. Support the telescope unit means the pedestal holds and secures the telescope unit in place. Providing stability ensures the telescope unit remains steady and properly positioned during operation. The mounting pedestal provides height adjustment capability, angular positioning, rotational mounting for tracking movement of one or more satellites, and vibration isolation for the telescope unit. The single-aperture telescope system comprises the primary optical telescope assembly configured to capture optical signals from the one or more satellites. The telescope unit further comprises precision optics configured to collect the captured optical signals from the primary optical telescope assembly.

The telescope unit further comprises a mechanical housing mechanically arranged to protect the primary optical telescope assembly and the precision optics. The single-aperture telescope system further comprises an optical path system comprising a mirror assembly configured to redirect the collected optical signals toward the central processing unit. A optical detector is positioned at the central processing unit and configured to receive the redirected optical signals and generate output signals for downstream and upstream communication.

Figure 2:
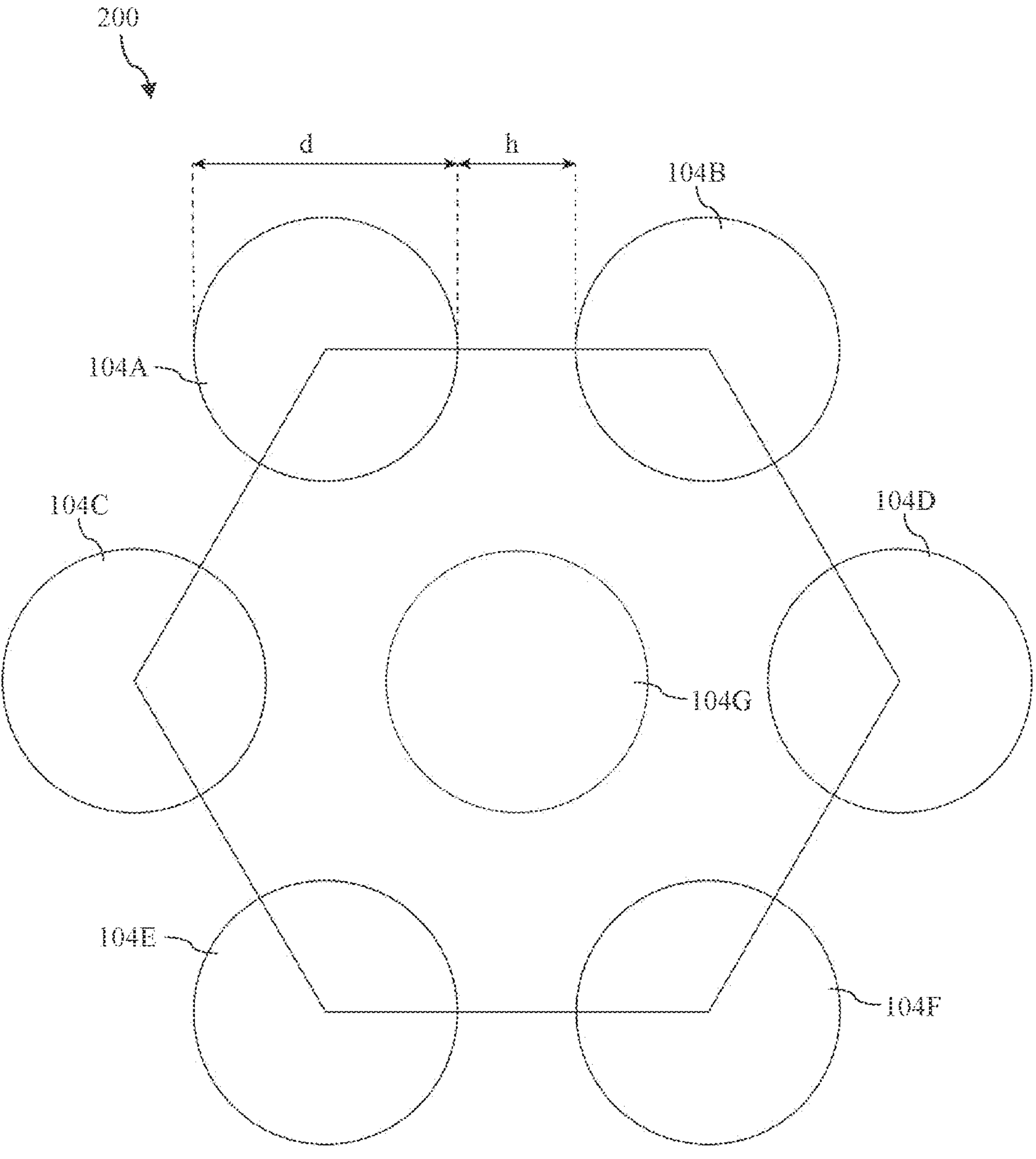
FIG. 2 is a schematic representation of the multi-aperture telescope system with a precise arrangement between the plurality of telescope units in a platform base, such as those shown in FIG. 1, for generating the combined optical signals received from the one or more satellites, in accordance with an embodiment of the present disclosure.

FIG. 2 is a schematic representation 200 of the multi-aperture telescope system 100 with a precise arrangement between the plurality of telescope units 102A-G in the platform base 106, such as those shown in FIG. 1, for generating the combined optical signals received from the one or more satellites, in accordance with an embodiment of the present disclosure.

FIG. 2 illustrates the precise geometric arrangement between the plurality of telescope units 102A-G within the platform base 106. FIG. 2 depicts a hexagonal outline representing the structural platform that provides the foundation for the multi-aperture telescope system 100. Six circles are positioned at each of the six vertices of the hexagon, representing the mounting locations for the six peripheral telescope units (102A-102F), while the center position accommodates the seventh telescope unit (102G). FIG. 2 represents dimensional annotations at the top, with the letter "d" indicating the diameter of each individual telescope unit and the letter "h" representing the spacing or gap between adjacent telescope mounting positions. These geometric relationships between the telescope diameter "d" and the inter-telescope spacing "h" are critical design parameters that determine the overall collecting area and structural dimensions of the multi-aperture optical ground station system. The hexagonal geometry optimizes the packing arrangement of telescope units to maximize the fill factor, which is the ratio of total light-collecting area to the overall footprint of the array. This precise arrangement ensures that when optical signals arrive from one or more satellites, each telescope unit captures its designated portion of the incoming wavefront, and the combined signals from the plurality of telescope units 102A-G generate an equivalent signal strength to a single large telescope with a collecting area equal to the sum of all individual telescope collecting areas.

Figure 3:
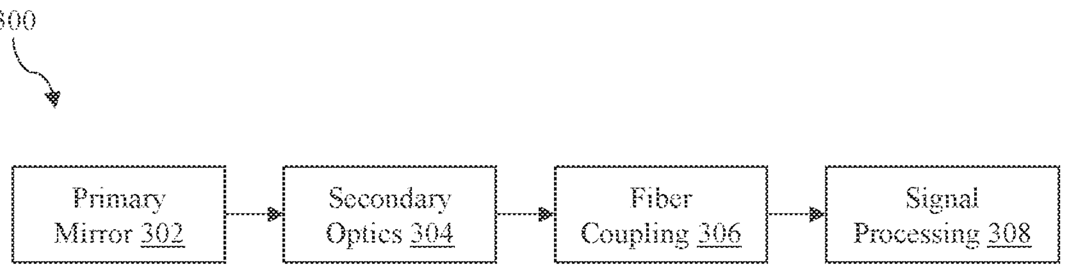
FIG. 3 illustrates a block diagram of an optical path system and a central processing unit, for generating the combined optical signals received from the one or more satellites, in accordance with an embodiment of the present disclosure.

FIG. 3 illustrates a block diagram 300 of the optical path system and the central processing unit, for generating the combined optical signals received from the one or more satellites, in accordance with an embodiment of the present disclosure. FIG. 3 shows four sequential processing stages connected by directional arrows indicating the flow of the one or more optical signals from left to right. The first block, labelled primary mirror 302, represents the initial light-collecting element that captures incoming optical signals from the one or more satellites, serving as the main aperture through which infrared laser beams enter the plurality of telescope units 102A-G. The second block, labelled secondary optics 304, represents additional optical components that further process, refine, and direct the collected one or more optical signals after they have been captured by the primary mirror 302. The third block, labelled fiber coupling 306, represents the mechanism by which the processed one or more optical signals are coupled into an optical fiber for transmission to the central processing location (i.e., the central processing unit), enabling the collected light to be efficiently guided from each telescope unit to the common optical detectors.

The fourth and final block, labelled signal processing 308 (performed by the central processing unit), represents the electronics and systems that convert the one or more optical signals into usable data, performing functions such as signal amplification, noise filtering, and data demodulation. This linear arrangement demonstrates how each telescope unit in the array independently captures, processes, and transmits its portion of the incoming satellite optical signal through the optical path system before the signals from the plurality of telescope units 102A-G are combined at the common optical detectors. The primary mirror 302 and the secondary optics 304 (i.e., beam steering optics) redirect the collected one or more optical signals along controlled optical paths that converge at the central processing point, while the mirror configuration maintains optical path length consistency to enable either coherent combining (preserving phase relationships) or incoherent combining (summing intensities) of the signals from the plurality of telescope units 102A-G.

Figure 4:
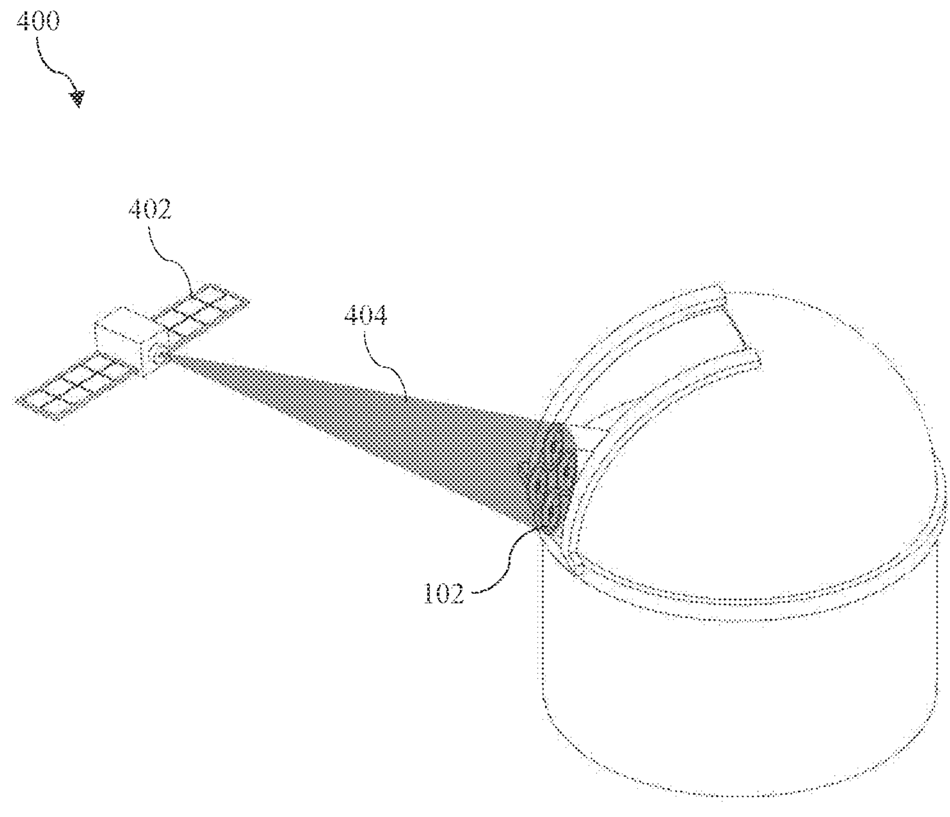
FIG. 4 illustrates an exemplary diagram depicting that the one or more optical signals from the one or more satellites are received at the plurality of telescope units, in accordance with an embodiment of the present disclosure.

FIG. 4 illustrates an exemplary diagram 400 depicting that the one or more optical signals 404 from the one or more satellites 402 are received at the plurality of telescope units 102A-G, in accordance with an embodiment of the present disclosure. FIG. 4 shows the one or more satellites 402 positioned in space, transmitting the one or more optical signals 404, primarily infrared laser beams, toward the ground station. The one or more optical signals 404 travel through the atmosphere and arrive at the plurality of telescope units 102A-G arranged on the platform base 106. Each telescope unit of the plurality of telescope units 102A-G simultaneously captures the portion of the incoming optical signals 404 from the one or more satellites 402.

Figure 5:
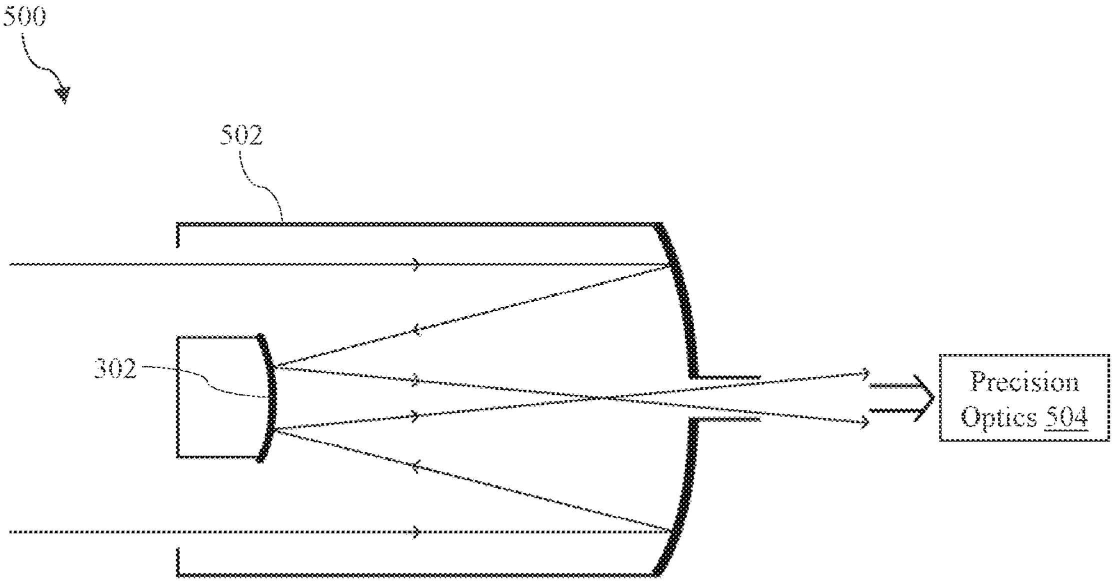
FIG. 5 illustrates a schematic representation of a primary optical telescope assembly, in accordance with an embodiment of the present disclosure.
Figure 5:
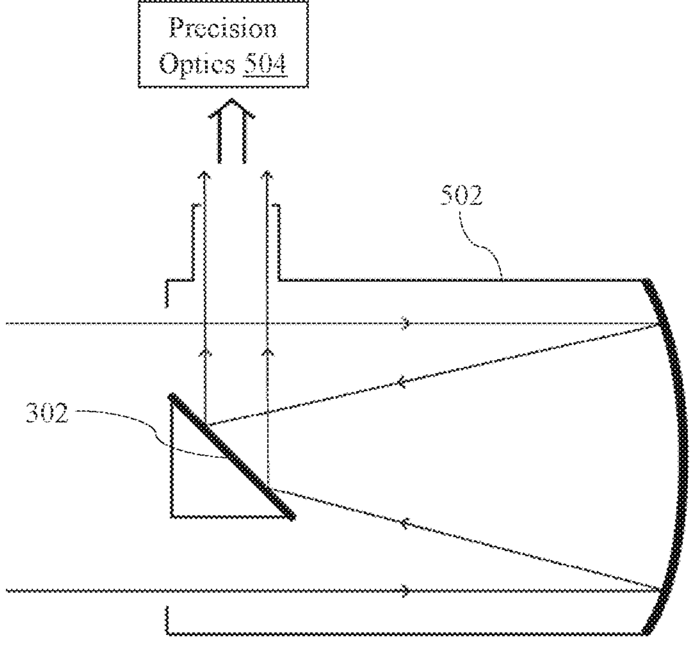

FIG. 5 illustrates a schematic representation 500 of the primary optical telescope assembly 502, in accordance with an embodiment of the present disclosure. The primary optical telescope assembly 502 is the main light-gathering component of each telescope unit that captures incoming optical signals 404 from the one or more satellites 402. The primary optical telescope assembly 502 includes the primary mirror 302 that serves as the initial light-collecting element, capturing infrared laser beams (i.e., optical signals 404) transmitted from the one or more satellites 402. The primary mirror 302 collects a portion of the incoming wavefront from the satellite signal and directs it toward the precision optics 504 for further processing. Each telescope unit in the plurality of telescope units 102A-G comprises its own primary optical telescope assembly 502, enabling independent capture of optical signals 404.

Figure 6:
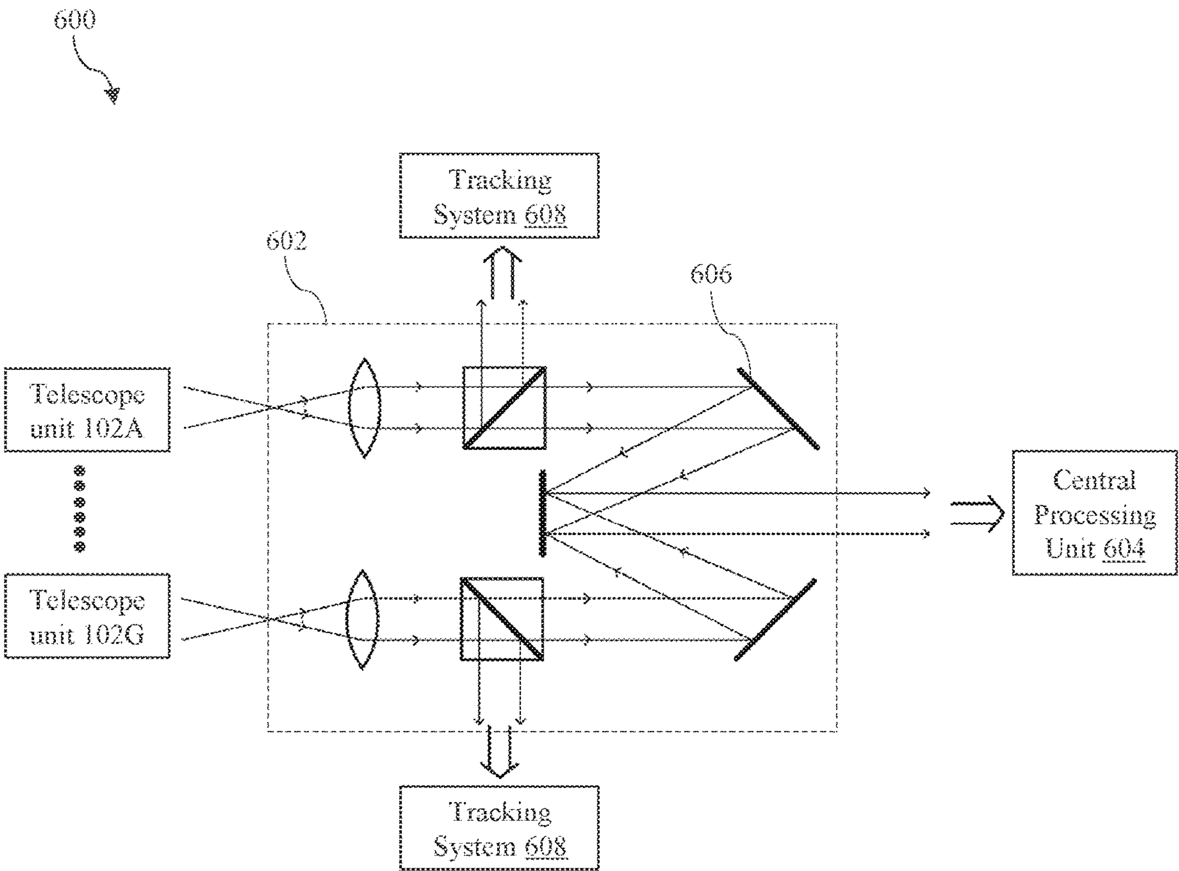
FIG. 6 illustrates a schematic representation of the multi-aperture telescope system with the optical path system showing coherent combining of the one or more optical signals, in accordance with an embodiment of the present disclosure.

FIG. 6 illustrates a schematic representation 600 of the multi-aperture telescope system 100 with the optical path system 602 showing coherent combining of the one or more optical signals 404, in accordance with an embodiment of the present disclosure. In this configuration, the optical path system 602 comprises the plurality of mirror assemblies 606 configured to redirect the collected optical signals 404 from each of the plurality of telescope units 102A-G toward the central processing unit 604. The optical path system 602 carefully controls the distance travelled by light from each telescope unit so that all the light waves arrive at the optical detector with their phase relationships preserved and synchronized. The optical path lengths are precisely maintained to within a fraction of the wavelength of light, ensuring that the one or more optical signals 404 from the plurality of telescope units 102A-G arrive "in phase" where their peaks and troughs align. This allows the one or more optical signals 404 to constructively add together for maximum signal strength at the optical detector. The coherent combining is more complex to implement but achieves higher signal quality. The tracking system 608 that enables the plurality of telescope units 102A-G to follow and maintain alignment with the one or more satellites 402 as the one or more satellites 402 move across the sky.

Figure 7:
FIG. 7 illustrates a schematic representation of the multi-aperture telescope system with the optical path system showing incoherent combining of the one or more optical signals, in accordance with an embodiment of the present disclosure.
Figure 7:
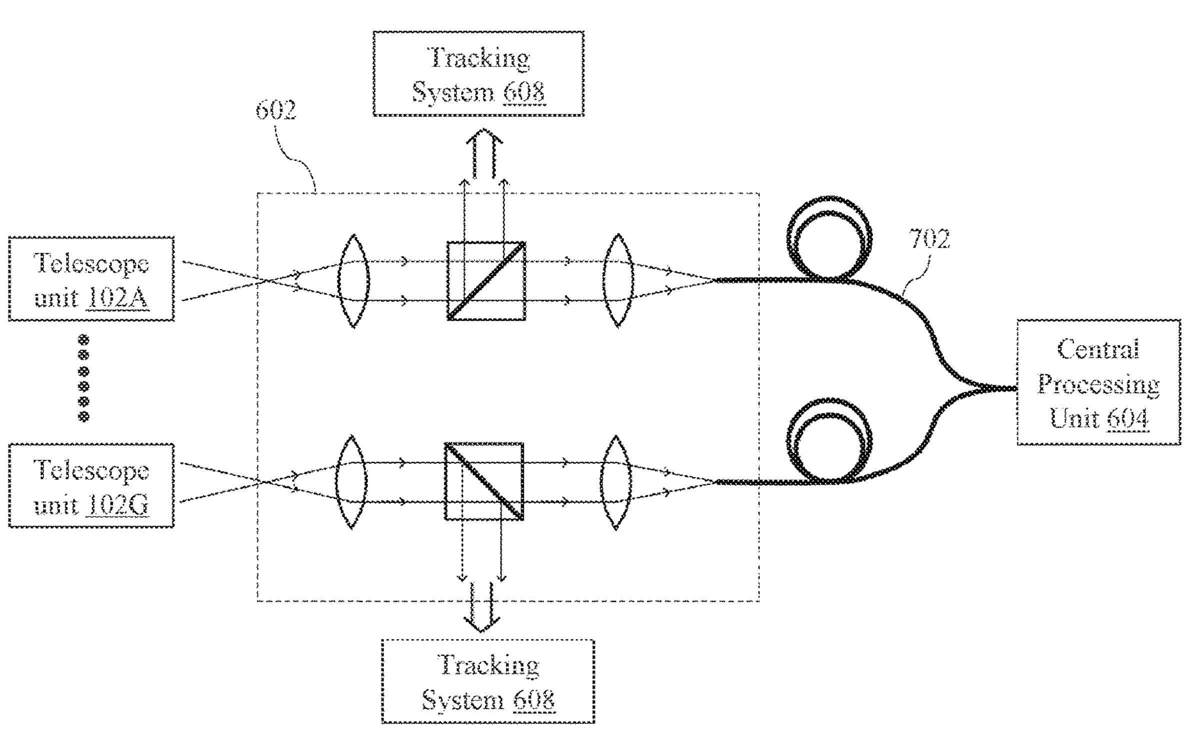

FIG. 7 illustrates a schematic representation 700 of the multi-aperture telescope system 100 with the optical path system 602 showing incoherent combining of the one or more optical signals 404, in accordance with an embodiment of the present disclosure. In this configuration, the optical path system 602 simply adds together the light intensities 702 from each telescope unit without regard to the phase relationships of the light waves. Unlike coherent combining where precise optical path length control is required to synchronize wave phases, incoherent combining focuses only on collecting and summing the total optical power from the plurality of telescope units 102A-G. The optical detector receives the light from all telescopes and integrates the combined optical power, producing a total signal strength proportional to the sum of the individual light intensities 702. This approach is simpler to implement because it does not require the complex phase control mechanisms needed for coherent combining.

Figure 8:
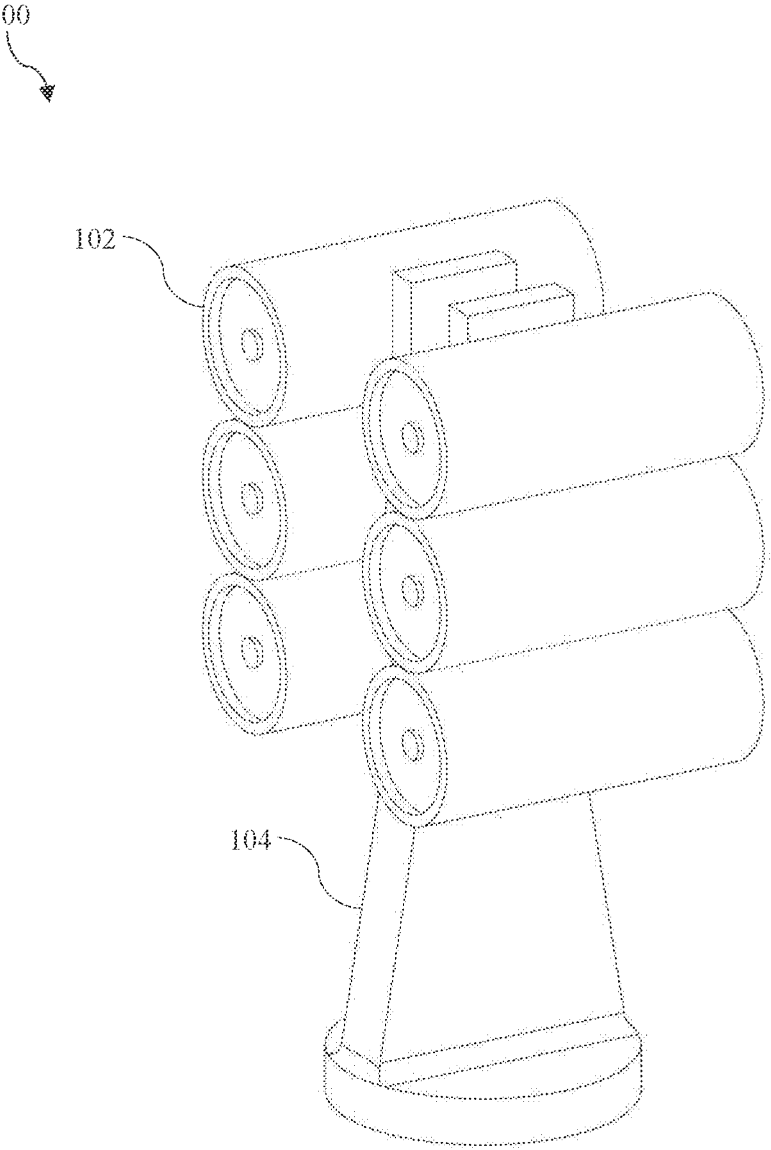
FIG. 8 illustrates a schematic representation of the multi-aperture telescope system showing the plurality of telescope units that are supported by a single mounting pedestal, in accordance with an embodiment of the present disclosure.

FIG. 8 illustrates a schematic representation 800 of the multi-aperture telescope system 100 showing the plurality of telescope units 102A-G that are supported by a single mounting pedestal 104, in accordance with an embodiment of the present disclosure. FIG. 8 shows the arrangement of the plurality of telescope units 102A-G in the single mounting pedestal 104. The single mounting pedestal 104 supports the plurality of telescope units 102A-G for providing stability to the plurality of telescope units 102A-G. The single mounting pedestal 104 further provides height adjustment capability, angular positioning, rotational mounting for the tracking movement of the one or more satellites 402, and the vibration isolation for the plurality of telescope units 102A-G.

FIG. 9A-9B is a flow chart illustrating a multi-aperture telescope method 900 for generating the combined optical signals received from the one or more satellites 402, in accordance with an embodiment of the present disclosure.

At step 902, the portion of one or more optical signals are captured from the one or more satellites 402 by the primary optical telescope assembly of each of the plurality of telescope units 102A-G. The plurality of telescope units 102A-G are arranged on a platform base 106. The platform base 106 possesses the geometry defining the one or more mounting points.

At step 904, the captured one or more optical signals are collected from the primary optical telescope assembly by the precision optics of each of the plurality of telescope units 102A-G based on the optical path system.

At step 906, corresponding telescope unit of the plurality of telescope units 102A-G, is supported by each mounting pedestal of the one or more mounting pedestals 104A-G, for providing stability to the plurality of telescope units 102A-G. The one or more mounting pedestals 104A-G are arranged on the platform base 106.

At step 908, the angular positioning, rotational mounting for tracking movement of the one or more satellites 402, and vibration isolation for the plurality of telescope units, are provided by each mounting pedestal of the one or more mounting pedestals 104A-G.

At step 910, the collected one or more optical signals are redirected toward the central processing unit by at least one of: the plurality of mirror assemblies 606 and the optical fibers. The optical path system is configured to maintain optical path length consistency among the plurality of telescope units 102A-G for coherent detection.

At step 912, upon receiving the redirected one or more optical signals from the precision optics of each of the plurality of telescope units 102A-G, the redirected one or more optical signals are combined by the one or more optical detectors.

At step 914, the combined one or more optical signals possessing an equivalent signal strength to a single telescope unit with a collecting area equal to a sum of collecting areas of the plurality of telescope units, are generated by the one or more optical detectors. The one or more optical detectors are positioned at the central processing unit.

In FIG. 9A-9B, the circular symbol with "A" written inside is being used as an off-page connector. This is used for indicating that FIG. 9A continues to the next page as FIG. 9B.

The laboratory validation for the scalable multi-aperture approach is provided. Using a 30 cm diameter telescope as a baseline reference, a single 15 cm diameter telescope was shown to collect approximately 25% of the received optical signal, corresponding to one-quarter of the collecting area. When four 15 cm diameter telescopes were deployed and their outputs were combined, the total collected signal reached 100% of the baseline level, effectively matching the performance of the single 30 cm aperture. This result empirically validates the scalability and signal equivalence of the multi-aperture architecture, demonstrating that distributed smaller apertures can collectively achieve the same optical collection efficiency as a larger monolithic telescope.

Numerous advantages of the present disclosure may be apparent from the discussion above. The present invention with the multi-aperture telescope system 100 is configured to for generate the combined one or more optical signals received from one or more satellites 402. The multi-aperture telescope system 100 is specifically designed for optical ground station satellite communication. Unlike radio astronomy arrays or optical interferometry for imaging, the multi-aperture telescope system 100 is optimized for power collection and communication link performance.

The disclosed multi-aperture telescope system 100 provides significant technical advantages through a distributed-aperture architecture in which multiple independent optical paths collectively improve link robustness and operational reliability. Spatial diversity among the apertures reduces sensitivity to localized atmospheric turbulence, resulting in enhanced signal stability and reduced scintillation effects compared to a single large-aperture system. The use of smaller optical apertures further enables relaxed optical quality requirements, as such apertures are inherently more tolerant of aberrations, allow for looser manufacturing tolerances, and simplify optical alignment and maintenance. Additionally, the multi-aperture telescope system 100 exhibits graceful degradation, wherein overall performance decreases in a predictable and proportional manner as individual telescopes become unavailable, thereby avoiding catastrophic system failure and ensuring continuous, albeit reduced, operational capability.

The disclosed multi-aperture telescope system 100 offers substantial economic and operational advantages by replacing a single large custom telescope with multiple smaller, standardized optical units. Capital expenditure is significantly reduced because small-aperture telescopes are available as commercial off-the-shelf components, benefit from economies of scale when procured in quantity, and eliminate the need for costly custom optical fabrication, resulting in an estimated cost reduction of approximately 40-60% compared to an equivalent large-aperture system.

Procurement lead times are shortened due to multi-vendor availability and supply chain diversity, reducing deployment delays and project risk. Operational reliability is enhanced through inherent redundancy, as the multi-aperture telescope system 100 has no single point of failure and continues operating at reduced capacity in the event of individual unit failures, thereby extending overall system availability and mean time between complete outages. Logistics and installation are simplified because smaller, lightweight modules can be transported using standard shipping methods, deployed at remote sites without heavy lifting equipment, and installed through a modular process by on-site personnel.

The multi-aperture telescope system 100 further enables flexible scalability, allowing systems to be deployed initially in a minimal configuration and expanded incrementally without service disruption, while modularity improves maintainability by permitting individual units to be replaced or serviced independently, reducing mean time to repair. Finally, the multi-aperture telescope system 100 is adaptable to diverse mission profiles by enabling adjustment of array size, active telescope count, and optical configuration to optimize cost and performance for varying link budgets, satellite constellations, and operational wavelengths.

The disclosed multi-aperture telescope system 100 is applicable to a wide range of commercial, governmental, and scientific communication infrastructures, including commercial satellite communication ground stations for high-throughput satellites, LEO and MEO constellations, and optical inter-satellite link ground gateways. The multi-aperture telescope system 100 is well suited for government and military use cases such as secure satellite communications, intelligence, surveillance, and reconnaissance data downlinks, tactical terminals, and space situational awareness reception. The multi-aperture telescope system 100 further supports space agency ground networks for deep-space optical communications, Earth observation data downlink, scientific mission telemetry, and CubeSat or small satellite networks. Commercial space data services may employ the multi-aperture telescope system 100 for Earth observation, remote sensing, satellite imagery reception, and data aggregation networks, while emerging satellite internet services can leverage it for high-capacity optical feeder links, backhaul, and trunking stations for broadband constellations.

The multi-aperture telescope system 100 is also compatible with quantum communication networks, including quantum key distribution and satellite-to-ground entanglement distribution. In addition, the multi-aperture telescope system 100 extends to secondary and future applications such as terrestrial and maritime free-space optical links, disaster recovery communications, atmospheric research and propagation studies, modified astronomical observation and tracking applications, and hybrid RF/optical ground stations providing multi-band, redundant communication pathways.

The multi-aperture telescope system 100 may be initially deployed in a minimum viable configuration, such as two or three telescope units, and subsequently expanded by adding additional telescopes as budget permits or operational demand increases. Each added telescope unit contributes a proportional improvement in overall system performance, enabling incremental capacity growth without service interruption. This approach eliminates the need for complete system replacement when upgrading capability, thereby supporting cost-effective and future-proof scalability.

The multi-aperture telescope system 100 supports numerous implementation variations, including different array geometries such as linear, circular, or irregular arrangements, as well as alternative telescope size ratios and scalable aperture combinations. The signal outputs may be combined using various techniques, including fiber-coupled or coherent combining methods, and the array configuration may be dynamically adjusted in response to changing link conditions or operational requirements. The multi-aperture telescope system 100 further allows integration with radio-frequency communication systems to enable hybrid RF/optical operation, and may be implemented in fixed, mobile, or transportable ground station platforms. Additionally, the number of telescope units may be selected to suit specific performance and cost objectives, with exemplary configurations including arrays of 4, 7, 12, 19, or other suitable quantities.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, and the like. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, and the like. of those described herein) will be apparent to persons skilled in the relevant art(s) based on the teachings contained herein. Such alternatives fall within the scope and spirit of the disclosed embodiments. Also, the words “comprising,” “having,” “containing,” and “including,” and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms “a,” “an,” and “the” include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A multi-aperture telescope system for generating combined one or more optical signals received from one or more satellites, the multi-aperture telescope system comprising:

a platform base possessing a geometry defining one or more mounting points;

a plurality of telescope units arranged on the platform base, wherein each telescope unit comprises:

a primary optical telescope assembly configured to capture a portion of one or more optical signals from the one or more satellites; and a precision optics configured to collect the captured one or more optical signals from the primary optical telescope assembly based on an optical path system;

one or more mounting pedestals arranged on the platform base, wherein each mounting pedestal of the one or more mounting pedestals is configured to:

support corresponding telescope unit of the plurality of telescope units for providing stability to the plurality of telescope units; and provide height adjustment capability, angular positioning, rotational mounting for tracking movement of the one or more satellites, and vibration isolation for the plurality of telescope units;

the optical path system comprising at least one of: a plurality of mirror assemblies and optical fibers, configured to redirect the collected one or more optical signals toward a central processing unit, wherein the optical path system is configured to maintain optical path length consistency among the plurality of telescope units for coherent detection; and one or more optical detectors positioned at the central processing unit and configured to:

upon receiving the redirected one or more optical signals from the precision optics of each of the plurality of telescope units, combine the redirected one or more optical signals; and generate the combined one or more optical signals possessing an equivalent signal strength to a single telescope unit with a collecting area equal to a sum of collecting areas of the plurality of telescope units.

2. The multi-aperture telescope system of claim 1, wherein the plurality of telescope units is configured to collectively define a combined collecting area at least one of: equal to and greater than a collecting area associated with a single telescope unit of equivalent diameter D, wherein individual telescope units possess at least one of: equal and unequal aperture diameters, which are dependent of fried parameter $r_0$, selected according to at least one of: atmospheric conditions, the geometry of the platform base, and number of the plurality of telescope units, and wherein each telescope unit of the plurality of telescope units is selectively configurable to operate as a transmit telescope for transmitting the one or more optical signals toward a remote terminal, and to dynamically switch between transmit and receive operation.

3. The multi-aperture telescope system of claim 1, wherein the optical path system is configured to combine the redirected one or more optical signals coherently at the one or more optical detectors by controlling optical path lengths to maintain phase relationships among the redirected one or more optical signals from the precision optics of each of the plurality of telescope units.

4. The multi-aperture telescope system of claim 1, wherein the optical path system is configured to combine the redirected one or more optical signals incoherently at the one or more optical detectors by combining intensities of the redirected one or more optical signals from the precision optics of each of the plurality of telescope units.

5. The multi-aperture telescope system of claim 1, wherein each of the plurality of telescope units is configured to be operated independently, adapting the multi-aperture telescope system in a multi-aperture optical ground station to continue functioning when at least one of the plurality of telescope units is non-operational.

6. The multi-aperture telescope system of claim 1, wherein the platform base possesses at least one of: a hexagonal geometry, a linear geometry, a circular geometry, and a random geometry, and wherein the platform base comprises pre-determined number of the plurality of telescope units positioned at vertices of the corresponding geometry.

7. The multi-aperture telescope system of claim 1, wherein each of the plurality of telescope units is a hot-swappable module configured to be removed and replaced without shutting down the multi-aperture telescope system in the multi-aperture optical ground station.

8. The multi-aperture telescope system of claim 1, wherein the central processing unit comprises at least one of: a signal combining optics and detection and data processing electronics, configured to process the combined one or more optical signals for downstream and upstream communication.

9. A multi-aperture telescope method for generating combined one or more optical signals received from one or more satellites based on a multi-aperture telescope system, the multi-aperture telescope method comprising:

capturing, by a primary optical telescope assembly of each of a plurality of telescope units, a portion of one or more optical signals from the one or more satellites, wherein the plurality of telescope units are arranged on a platform base, and wherein the platform base possesses a geometry defining one or more mounting points;

collecting, by a precision optics of each of the plurality of telescope units, the captured one or more optical signals from the primary optical telescope assembly based on an optical path system;

supporting, by each mounting pedestal of one or more mounting pedestals, corresponding telescope unit of the plurality of telescope units for providing stability to the plurality of telescope units, wherein the one or more mounting pedestals arranged on the platform base;

providing, by each mounting pedestal of the one or more mounting pedestals, height adjustment capability, angular positioning, rotational mounting for tracking movement of the one or more satellites, and vibration isolation for the plurality of telescope units;

redirecting, by at least one of: a plurality of mirror assemblies and optical fibers, of the optical path system, the collected one or more optical signals toward a central processing unit, wherein the optical path system is configured to maintain optical path length consistency among the plurality of telescope units for coherent detection;

upon receiving the redirected one or more optical signals from the precision optics of each of the plurality of telescope units, combining, by one or more optical detectors, the redirected one or more optical signals; and generating, by the one or more optical detectors, the combined one or more optical signals possessing an equivalent signal strength to a single telescope unit with a collecting area equal to a sum of collecting areas of the plurality of telescope units, wherein the one or more optical detectors is positioned at the central processing unit.

10. The multi-aperture telescope method of claim 9, further comprising combining, by the optical path system, the redirected one or more optical signals coherently at the one or more optical detectors by controlling optical path lengths to maintain phase relationships among the redirected one or more optical signals from the precision optics of each of the plurality of telescope units.

11. The multi-aperture telescope method of claim 9, further comprising combining, by the optical path system, the redirected one or more optical signals incoherently at the one or more optical detectors by combining intensities of the redirected one or more optical signals from the precision optics of each of the plurality of telescope units.

12. The multi-aperture telescope method of claim 9, further comprising processing, by at least one of: a signal combining optics and detection and data processing electronics, of the central processing unit, the combined one or more optical signals for downstream and upstream communication.

13. The multi-aperture telescope method of claim 9, wherein the plurality of telescope units is configured to collectively define a combined collecting area at least one of: equal to and greater than a collecting area associated with a single telescope unit of equivalent diameter D, wherein individual telescope units possess at least one of: equal and unequal aperture diameters, which are dependent of fried parameter $r_0$, selected according to at least one of: atmospheric conditions, the geometry of the platform base, and number of the plurality of telescope units, and wherein each telescope unit of the plurality of telescope units is configured to operate as a transmit telescope for transmitting one or more optical signals toward a remote terminal, and to dynamically switch between transmit and receive operation.

14. The multi-aperture telescope method of claim 9, wherein each of the plurality of telescope units is configured to be operated independently, adapting the multi-aperture telescope system in a multi-aperture optical ground station to continue functioning when at least one of the plurality of telescope units is non-operational, and wherein each of the plurality of telescope units is a hot-swappable module configured to be removed and replaced without shutting down the multi-aperture telescope system in the multi-aperture optical ground station.

15. The multi-aperture telescope method of claim 9, wherein the platform base possesses at least one of: a hexagonal geometry, a linear geometry, a circular geometry, and a random geometry, and wherein the platform base comprises pre-determined number of the plurality of telescope units positioned at vertices of the corresponding geometry.

16. A non-transitory computer-readable storage medium having instructions stored therein that when executed by one or more hardware processors of a multi-aperture telescope system, cause the one or more hardware processors to execute operations of:

capturing, by a primary optical telescope assembly of each of a plurality of telescope units, a portion of one or more optical signals from the one or more satellites, wherein the plurality of telescope units are arranged on a platform base, and wherein the platform base possesses a geometry defining one or more mounting points;

collecting, by a precision optics of each of the plurality of telescope units, the captured one or more optical signals from the primary optical telescope assembly based on an optical path system;

supporting, by each mounting pedestal of one or more mounting pedestals, corresponding telescope unit of the plurality of telescope units for providing stability to the plurality of telescope units, wherein the one or more mounting pedestals arranged on the platform base;

providing, by each mounting pedestal of the one or more mounting pedestals, height adjustment capability, angular positioning, rotational mounting for tracking movement of the one or more satellites, and vibration isolation for the plurality of telescope units;

redirecting, by a plurality of mirror assemblies of the optical path system, the collected one or more optical signals toward a central processing unit, wherein the optical path system is configured to maintain optical path length consistency among the plurality of telescope units for coherent detection;

upon receiving the redirected one or more optical signals from the precision optics of each of the plurality of telescope units, combining, by one or more optical detectors, the redirected one or more optical signals; and generating, by the one or more optical detectors, the combined one or more optical signals possessing an equivalent signal strength to a single telescope unit with a collecting area equal to a sum of collecting areas of the plurality of telescope units, wherein the one or more optical detectors are positioned at the central processing unit.

17. The non-transitory computer-readable storage medium of claim 16, further comprising at least one of:

combining, by the optical path system, the redirected one or more optical signals coherently at the one or more optical detectors by controlling optical path lengths to maintain phase relationships among the redirected one or more optical signals from the precision optics of each of the plurality of telescope units; and combining, by the optical path system, the redirected one or more optical signals incoherently at the one or more optical detectors by combining intensities of the redirected one or more optical signals from the precision optics of each of the plurality of telescope units.

18. The non-transitory computer-readable storage medium of claim 16, further comprising processing, by at least one of: a signal combining optics and detection and data processing electronics, of the central processing unit, the combined one or more optical signals for downstream and upstream communication.

19. The non-transitory computer-readable storage medium of claim 16, wherein the plurality of telescope units is configured to collectively define a combined collecting area at least one of: equal to and greater than a collecting area associated with a single telescope unit of equivalent diameter D, wherein individual telescope units possess at least one of: equal and unequal aperture diameters, which are dependent of fried parameter $r_0$, selected according to at least one of: atmospheric conditions, the geometry of the platform base, and number of the plurality of telescope units, and wherein each telescope unit of the plurality of telescope units is configured to operate as a transmit telescope for transmitting one or more optical signals toward a remote terminal, and to dynamically switch between transmit and receive operation.

20. The non-transitory computer-readable storage medium of claim 16, wherein each of the plurality of telescope units is configured to be operated independently, adapting the multi-aperture telescope system in a multi-aperture optical ground station to continue functioning when at least one of the plurality of telescope units is non-operational, and wherein each of the plurality of telescope units is a hot-swappable module configured to be removed and replaced without shutting down the multi-aperture telescope system in the multi-aperture optical ground station.

* * * * *